(12) United States Patent
Kuroyanagi et al.

(10) Patent No.: US 10,811,921 B2
(45) Date of Patent: Oct. 20, 2020

(54) INSULATING MEMBER AND STATOR

(71) Applicants: AISIN AW CO., LTD., Anjo-shi, Aichi-ken (JP); HAYASHIKOGYOSYO CO., LTD., Nakatsugawa-shi, Gifu-ken (JP)

(72) Inventors: Toru Kuroyanagi, Okazaki (JP); Ko Kajita, Mizunami (JP); Takahiko Hobo, Nakatsugawa (JP)

(73) Assignees: AISIN AW CO., LTD., Anjo (JP); HAYASHIKOGYOSYO CO., LTD., Nakatsugawa-shi (JP)

( * ) Notice: Subject to any disclaimer, the term of this patent is extended or adjusted under 35 U.S.C. 154(b) by 70 days.

(21) Appl. No.: 16/081,243

(22) PCT Filed: Mar. 30, 2017

(86) PCT No.: PCT/JP2017/013317
§ 371 (c)(1),
(2) Date: Aug. 30, 2018

(87) PCT Pub. No.: WO2017/170895
PCT Pub. Date: Oct. 5, 2017

(65) Prior Publication Data
US 2019/0207459 A1 Jul. 4, 2019

(30) Foreign Application Priority Data
Mar. 31, 2016 (JP) .................................. 2016-070405

(51) Int. Cl.
*H02K 3/34* (2006.01)
*H02K 3/52* (2006.01)
*H02K 15/10* (2006.01)

(52) U.S. Cl.
CPC ............... *H02K 3/345* (2013.01); *H02K 3/34* (2013.01); *H02K 3/525* (2013.01); *H02K 15/105* (2013.01)

(58) Field of Classification Search
CPC ........ H02K 3/345; H02K 3/34; H02K 15/105; H02K 3/525
(Continued)

(56) References Cited

U.S. PATENT DOCUMENTS 5,659,219 A 8/1997 Momose et al.
5,721,397 A * 2/1998 Weinberg ............... H01B 3/422
174/110 N
(Continued)

FOREIGN PATENT DOCUMENTS

JP S58-157349 A 9/1983
JP 2941164 B2 8/1999
(Continued)

OTHER PUBLICATIONS

English translation, Kuroyanagi (JP 2015177598 A, IDS), printed on Apr. 14, 2020.*
(Continued)

*Primary Examiner* — John K Kim
(74) *Attorney, Agent, or Firm* — Oliff PLC

(57) ABSTRACT

An insulating member that includes an insulating member body including a first insulating sheet provided in an annular shape to cover a coil that includes a slot-held section and a coil end section, the slot-held section configured to be held in a slot of a stator core, the coil end section configured to protrude from an end surface of the stator core in a rotation axis direction, wherein the first insulating sheet includes a folded-back section that is provided in a portion corresponding to a bent section of the coil and in the portion the first
(Continued)

insulating sheet is folded back a plurality of times such that layers of the first insulating sheet are stacked.

11 Claims, 16 Drawing Sheets

(58) Field of Classification Search
USPC .................................................. 310/201, 215
See application file for complete search history.

(56) References Cited

U.S. PATENT DOCUMENTS

| | | | | |
|---|---|---|---|---|
| 6,124,660 | A * | 9/2000 | Umeda | H02K 1/243 |
| | | | | 310/201 |
| 6,335,583 | B1 * | 1/2002 | Kusase | H02K 1/165 |
| | | | | 310/201 |
| 6,346,758 | B1 * | 2/2002 | Nakamura | H02K 1/165 |
| | | | | 310/215 |
| 6,400,056 | B1 | 6/2002 | Naka et al. | |
| 6,972,506 | B2 * | 12/2005 | Onishi | H02K 3/345 |
| | | | | 310/215 |
| 6,995,491 | B2 * | 2/2006 | Kimura | H02K 3/345 |
| | | | | 310/215 |
| 9,590,461 | B2 * | 3/2017 | Kaneiwa | H02K 3/345 |
| 10,164,487 | B2 * | 12/2018 | Banba | H02K 15/024 |
| 2002/0089250 | A1 | 7/2002 | Naka et al. | |
| 2004/0189134 | A1 | 9/2004 | Onishi | |
| 2004/0256943 | A1 | 12/2004 | Omura | |
| 2014/0210304 | A1 | 7/2014 | Tamura | |
| 2019/0207459 | A1 * | 7/2019 | Kuroyanagi | H02K 3/34 |

FOREIGN PATENT DOCUMENTS

| | | |
|---|---|---|
| JP | 2000-308314 A | 11/2000 |
| JP | 2004-297964 A | 10/2004 |
| JP | 2005-012887 A | 1/2005 |
| JP | 2009-171720 A | 7/2009 |
| JP | 2010-154693 A | 7/2010 |
| JP | 2014-143885 A | 8/2014 |
| JP | 2015-177598 A | 10/2015 |

OTHER PUBLICATIONS

Jul. 4, 2017 Search Report issued in International Patent Application No. PCT/JP2017/013317.

* cited by examiner

INSULATING MEMBER AND STATOR

BACKGROUND

The present disclosure relates to an insulating member and a stator.

A stator having an insulating member is known. Such a stator is disclosed in, for example, Japanese Patent No. 2941164.

Japanese Patent No. 2941164 discloses a stator that includes three phase windings (coils) disposed in slots of a stator core. The windings of the stator are each formed by winding a conductive wire multiple times. Insulating paper is provided between coil end sections (sections of each winding that protrude from an end surface of the stator core in the rotating axis direction) of the windings of each phase. The insulating paper is structured to provide insulation between the coil end sections of the windings of each phase.

SUMMARY

However, according to Japanese Patent No. 2941164, although the insulating paper is provided between the coil end sections of the windings of each phase, there is a risk that the insulating paper (insulating member) provided between the coil end sections may be damaged because the shape of the coil is deformed relatively largely in the process of shaping (deforming) the coil. The problem with this is that there is a possibility that insulation between coils may become insufficient.

An exemplary aspect of the disclosure provides an insulating member and a stator that make it possible to prevent the possibility that insulation between coils becomes insufficient due to damage to the insulating member.

An insulating member according to a first aspect of the disclosure includes an insulating member body including a first insulating sheet provided in an annular shape to cover a coil that includes a slot-held section configured to be held in a slot of a stator core, and a coil end section configured to protrude from an end surface of the stator core in a rotation axis direction. The first insulating sheet includes a folded-back section that is provided in a portion corresponding to a bent section of the coil and in the portion the first insulating sheet is folded back multiple times such that layers of the first insulating sheet are stacked.

In the insulating member according to the first aspect of the disclosure, as described above, the first insulating sheet includes the folded-back section that is provided in a portion corresponding to the bent section of the coil and in the portion the first insulating sheet is folded back multiple times such that layers of the first insulating sheet are stacked. Thus, since the folded-back section where layers of the first insulating sheet are stacked is spread out (unfolded) to follow deformation of the bent section of the coil in the shaping process, the insulating member is prevented from being damaged due to the deformation of the coil. This prevents the possibility that insulation between coils becomes insufficient due to damage to an insulating member.

A stator according to a second aspect of the disclosure includes: a stator core; a coil that is disposed in the stator core and that includes a slot-held section that is held in a slot of the stator core, and a coil end section protruding from an end surface of the stator core in a rotation axis direction; and an insulating member provided in an annular shape to cover the coil. The insulating member includes a folded-back section that is provided in a portion corresponding to a bent section of the coil and in the portion the insulating member is folded back multiple times such that layers of the insulating member are stacked.

In the stator according to the second aspect of the disclosure, as described above, the insulating member includes the folded-back section that is provided in a portion corresponding to the bent section of the coil and in the portion the insulating member is folded back multiple times such that layers of the insulating member are stacked. Thus, since the folded-back section where layers of the first insulating sheet are stacked is spread out (unfolded) to follow deformation of the bent section of the coil in the shaping process, the insulating member is prevented from being damaged due to the deformation of the coil. This provides a stator that makes it possible to prevent the possibility that insulation between coils becomes insufficient due to damage to an insulating member.

According to the present disclosure, as described above, it is possible to prevent the possibility that insulation between coils becomes insufficient due to damage to an insulating member.

DETAILED DESCRIPTION OF EMBODIMENTS

Figure 1:
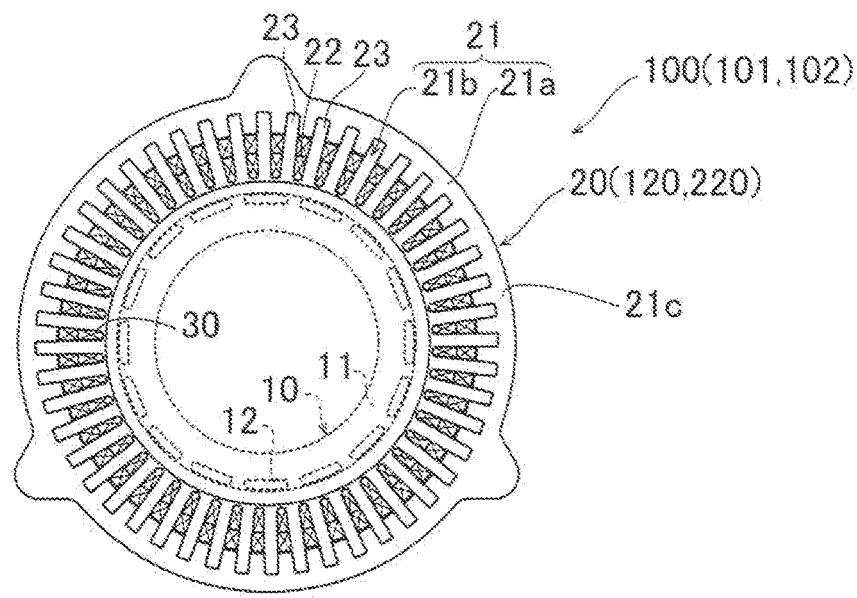
FIG. 1 is a plan view of a rotating electrical machine (a stator) according to first to third embodiments of the present disclosure.

Below, embodiments of the present disclosure are described on the basis of the drawings.

[First Embodiment]
(Structure of Stator)

With reference to FIGS. 1 to 19, the structure of a rotating electrical machine 100 (a stator 20) according to a first embodiment is described. In the present specification, a term "rotation axis direction" refers to the direction of axis of rotation of the rotating electrical machine 100 (a rotor 10). Further, a term "diametrical direction" refers to the diametrical direction (the radial direction) of the stator 20. In addition, a term "inner diameter side" refers to the inner diameter side of the stator 20 (or the inner circumferential side of an annular coil 30), and a term "outer diameter side" refers to the outer diameter side of the stator 20 (or the outer circumferential side of the annular coil 30).

As illustrated in FIG. 1, the rotating electrical machine 100 includes the rotor 10. A rotor core 11 of the rotor 10 is provided with multiple permanent magnets 12. The multiple permanent magnets 12 are arranged at substantially equal angular intervals along a circumferential direction.

The rotating electrical machine 100 further includes the stator 20 (a stator core 21) that is disposed in such a manner as to face the outer circumferential surface of the rotor core 11 in the radial direction. The stator core 21 includes an outer-diameter-side core 21a disposed on the outer diameter side, and an inner-diameter-side core 21b disposed on the inner diameter side. The outer-diameter-side core 21a and the inner-diameter-side core 21b are fitted together to structure the stator core 21 that has multiple (48 in the first embodiment) slots 22 (closed slots). Multiple teeth 23 are each provided between the slots 22.

Figure 2:
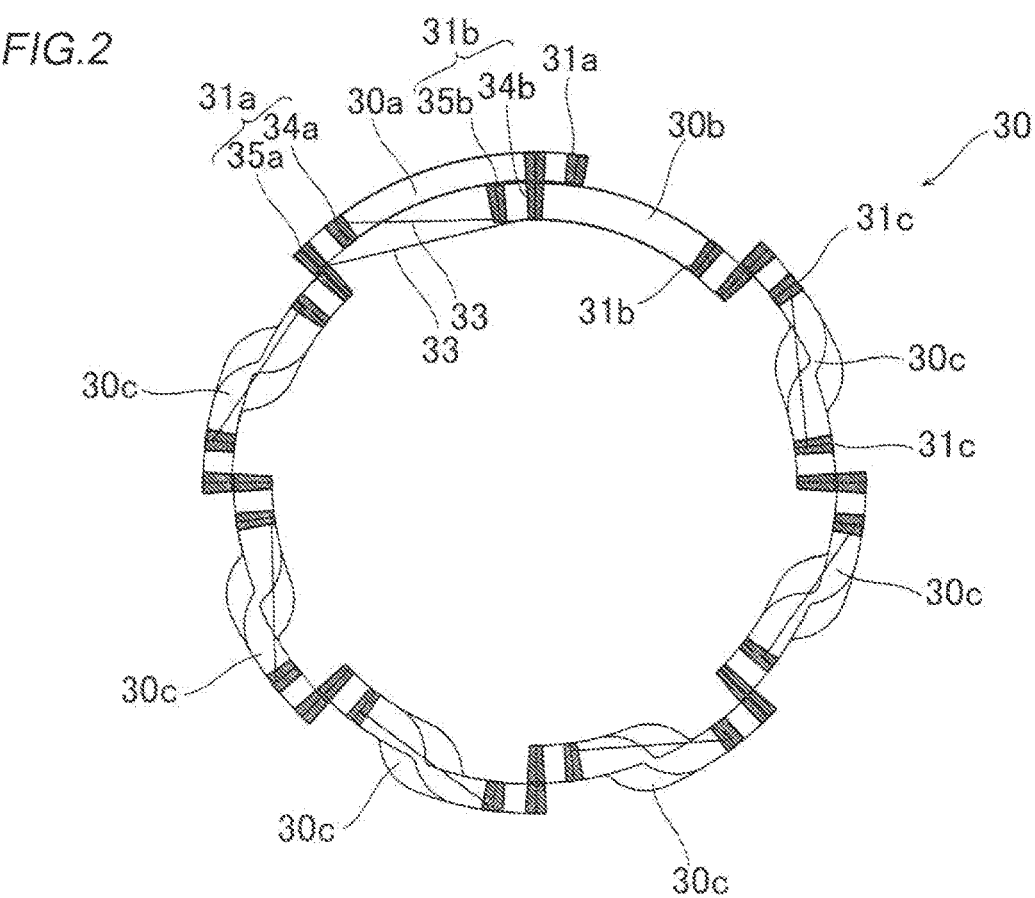
FIG. 2 is a diagram illustrating a coil according to the first to third embodiments of the present disclosure.

Further, as illustrated in FIG. 2, the stator 20 includes multiple (eight per phase in the first embodiment) coils 30 disposed in the stator core 21. The coil 30 includes one first coil 30a that is a single layer lap coil and that has slot-held sections 31a disposed on the outer diameter side of the slots 22. The coil 30 further includes one second coil 30b that is a single layer lap coil and that has slot-held sections 31b disposed on the inner diameter side of the slots 22. The coil 30 further includes multiple (six in the first embodiment) third coils 30c that is each a double layer lap coil and has slot-held sections 31c. One of the slot-held sections 31c is located on one side in the circumferential direction and is disposed on the outer diameter side of the slot 22. The other of the slot-held sections 31c is located on the other side in the circumferential direction and is disposed on the inner diameter side of the slot 22. FIG. 2 illustrates the coil 30 for one phase, out of the coils 30 for three phases. The first coil 30a, the second coil 30b, and the third coils 30c are examples of a "coil."

Figure 3:
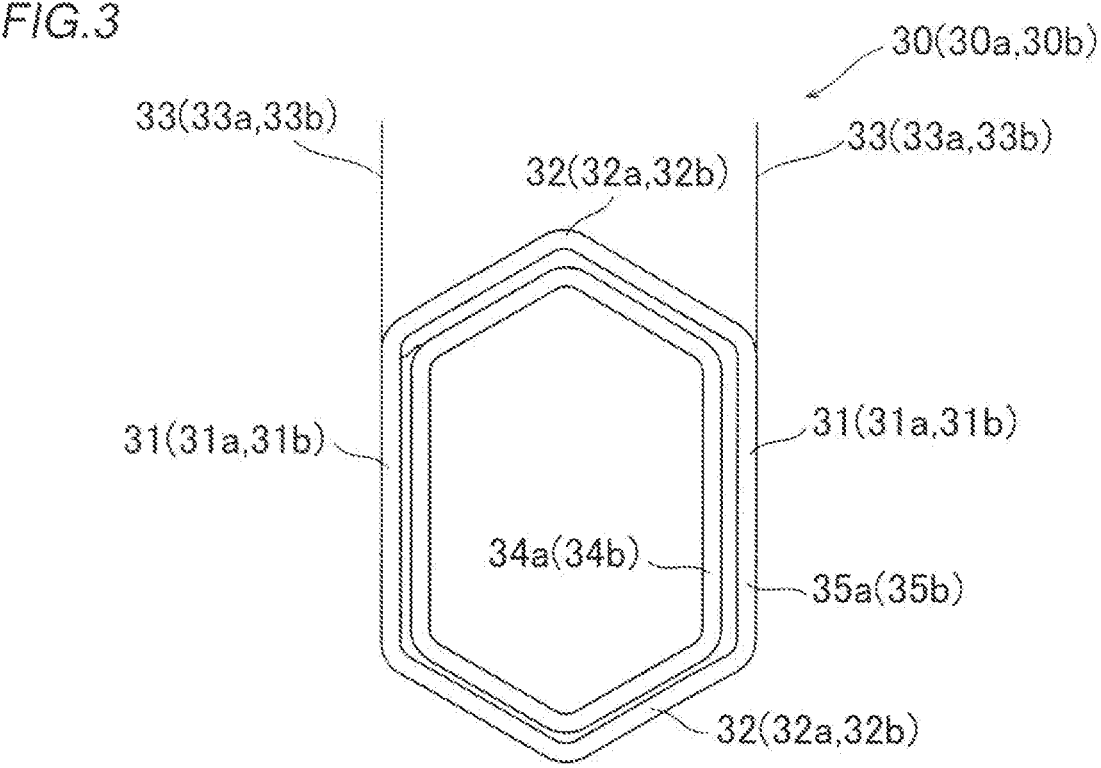
FIG. 3 is a diagram illustrating a first coil (a second coil) according to the first to third embodiments of the present disclosure.

As illustrated in FIG. 3, the first coil 30a includes the slot-held sections 31a, coil end sections 32a protruding from end surfaces 21c (refer to FIG. 1) of the stator core 21 in the rotation axis direction, and lead sections 33a. Further, the first coil 30 includes a first inner side coil portion 34a disposed on the inner side, and a first outer side coil portion 35a disposed on the outer side.

As illustrated in FIG. 3, as with the first coil 30a, the second coil 30b includes the slot-held sections 31b, coil end sections 32b, and lead sections 33b. Further, the second coil 30b includes a second inner side coil portion 34b disposed on the inner side, and a second outer side coil portion 35b disposed on the outer side.

Figure 4:
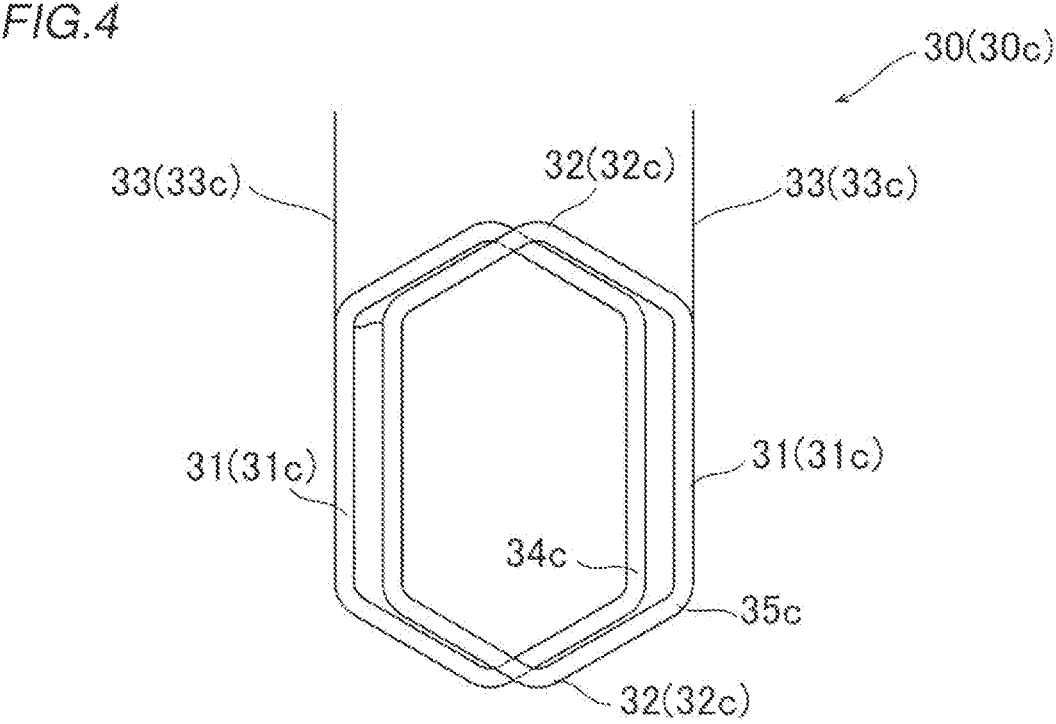
FIG. 4 is a diagram illustrating a third coil according to the first to third embodiments of the present disclosure.

As illustrated in FIG. 4, the third coil 30c includes the slot-held sections 31c, coil end sections 32c, and lead sections 33c. Further, the third coil 30c includes a third coil portion 34c disposed on one side in the circumferential direction, and a third coil portion 35c disposed on the other side in the circumferential direction. The third coil portion 34c and the third coil portion 35c are connected in series.

The first coil 30a, the second coil 30b, and the third coils 30c are connected in parallel to each other. The three phase coils 30 are connected in a Y configuration.

(Structure of Coil)

Figure 5:
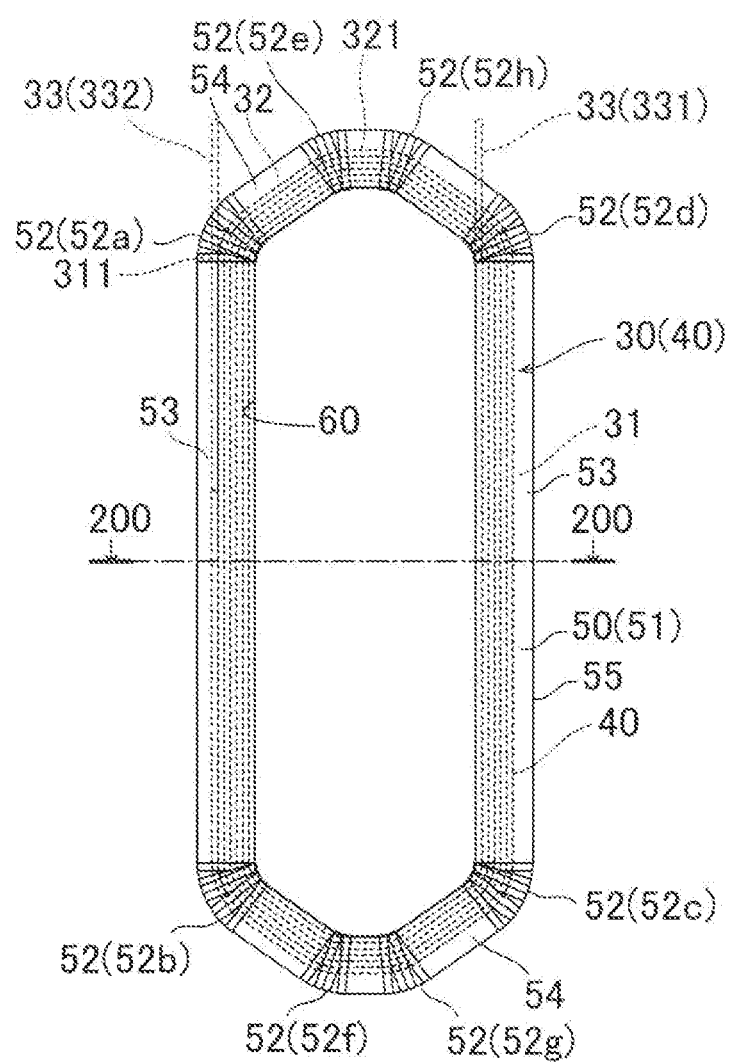
FIG. 5 is a diagram illustrating the coil and an insulating member according to the first embodiment of the present disclosure.

Next, the detailed structure of the coil 30 is described with reference to FIG. 5. It is noted that FIG. 5 illustrates a state of the coil 30 before the coil 30 is shaped (deformed) as described later. FIG. 5 illustrates the first inner side coil portion 34a or the first outer side coil portion 35a of the first coil 30a that is a single layer lap coil, the second inner side coil portion 34b or the second outer side coil portion 35b of the second coil 30b, or the third coil portion 34c or the third coil portion 35c of the third coil 30c.

The coil 30 includes slot-held sections 31 that are held in the slots 22 of the stator core 21, coil end sections 32 protruding from the end surfaces 21c of the stator core 21 in the rotation axis direction, and lead sections 33 that extend out of the stator core 21. The lead sections 33 are one end section and the other end section of a conductive wire 40 that structures the coil 30. The lead sections 33 serve as a power line for connection to an external circuit, such as a power source, and serves as a neutral line for connection to a point (hereinafter referred to as a neutral point) connected to the coils 30 of the other phases.

The coil 30 is formed by winding the conductive wire 40 in layers from the inner diameter side to the outer diameter side. The conductive wire 40 may be, for example, a round wire. A lead section 331 of the coil 30 that is disposed on the inner diameter side (the most inner diameter side) is connected to the power supply side. A lead section 332 of the coil 30 that is disposed on the outer diameter side (the most outer diameter side) is connected to the neutral point.

Figure 6:
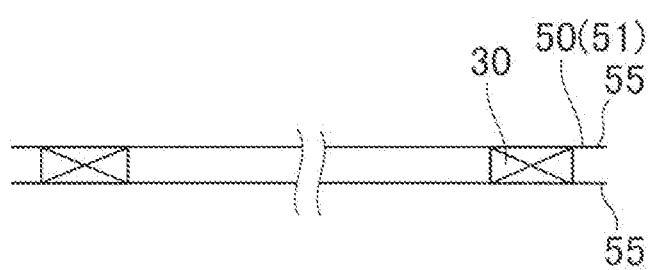
FIG. 6 is a cross-sectional view along line 200-200 in FIG. 5.

Further, as illustrated in FIG. 5 and FIG. 6, an annular insulating member 50 (an insulating sheet 51) is provided to cover the slot-held sections 31 and the coil end sections 32 in a substantially U-shape (in a substantially U-shape in cross section) from the inner diameter side (the inner circumference side) to the outer diameter side (the outer circumference side) of the coil 30. According to the first embodiment, the insulating sheet 51 includes folded-back sections 52 that are provided in portions corresponding to bent sections of the coil 30 and in the portions the insulating sheet 51 is folded back (folded up) multiple times such that layers of the insulating sheet 51 are stacked so that the insulating sheet 51 deforms along with deformation of the coil 30 in the process of shaping the coil 30. Specifically, the folded-back sections 52 are provided at sections (folded-back sections 52a to 52d) corresponding to the vicinities of the boundaries between the slot-held sections 31 and the coil end sections 32, and are provided at sections (folded-back sections 52e to 52h) corresponding to the vicinities of top portions 321 of the coil end sections 32. The insulating sheet 51 is an example of a "first insulating sheet" and an "insulating member body."

Figure 7:
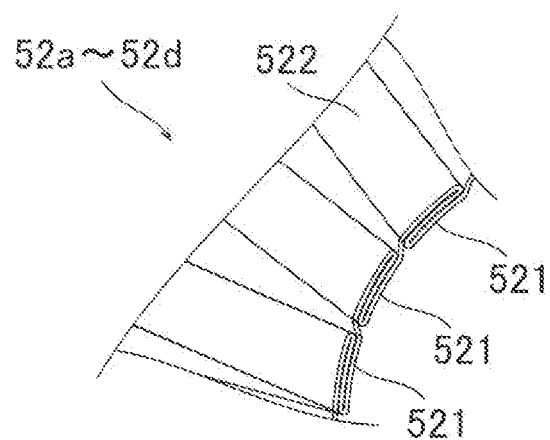
FIG. 7 is a partially enlarged view of FIG. 5 (in the vicinity of a boundary between a slot-held section and a coil end section).
Figure 8:
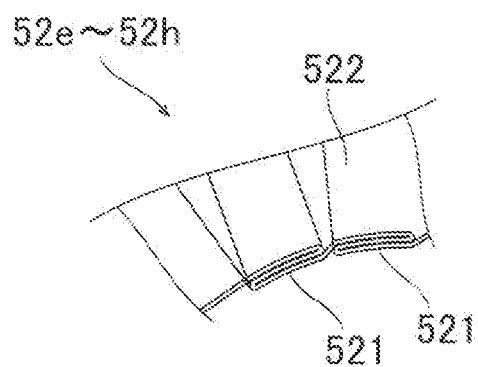
FIG. 8 is a partially enlarged view of FIG. 5 (in the vicinity of a top portion of the coil end section).
Figure 9:
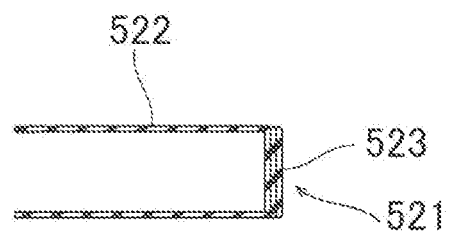
FIG. 9 is a diagram illustrating a substantially U-shaped insulating member.

Further, according to the first embodiment, as illustrated in FIGS. 7 to 9, at a portion of the folded-back section 52 corresponding to a bottom 521 of the substantially U-shape, the insulating sheet 51 is folded back such that the layers of the insulating sheet 51 are stacked to have an S-shape in cross section. On the other hand, at a portion of the folded-back section 52 corresponding to a side 522 of the substantially U-shape, the stacked layers overlap each other so as to deform along with deformation of the coil 30 in the shaping process. In FIG. 7 and FIG. 8, a cross-section of the bottom 521 is represented by a continuous line in order to clarify the shape of the bottom 521. At the portion corresponding to the bottom 521, the insulating sheet 51 is folded back twice such that the layers are stacked to have the S-shape in cross section. Thus, at the portion corresponding to the bottom 521, three layers of the insulating sheet 51 overlap each other.

Before being attached to a later-described bobbin 60, the insulating sheet 51 has a linear shape (refer to FIG. 13) in which the insulating sheet 51 is folded back such that the layers are stacked to have the S-shape in cross section at the portion corresponding to the side 522, as well as at the portion corresponding to the bottom 521. When the insulating sheet 51 is made into an annular shape (refer to FIG. 5) by being attached to the later-described bobbin 60, the stacked layers (the folds) of the insulating sheet 51 are opened (unfolded) like a fan. Specifically, the portion corresponding to the side 522 is opened like a fan about a portion close to the bottom 521. More specifically, the side 522 is opened to a relatively small degree at the portion close to the bottom 521, and the opening degree of the side 522 gradually increases in a direction away from the bottom 521. At the portion corresponding to the side 522, three or two layers of the insulating sheet 51 overlap each other. It is noted that part of the side 522 may be a single layer.

Further, according to the first embodiment, multiple portions each being the portion of the folded-back section 52 corresponding to the bottom 521 and having the S-shape in cross section are provided in a portion corresponding to the bent section of the coil 30 and are arranged sequentially in the circumferential direction (along the bent section of the coil 30). Specifically, as illustrated in FIG. 7, each of the folded-back sections 52a to 52d has three portions each being the portion of the folded-back section 52 corresponding to the bottom 521 and having the S-shape in cross section, and the three portions are arranged sequentially in the circumferential direction. Further, as illustrated in FIG. 8, each of the folded-back sections 52e to 52h has two portions each being the portion of the folded-back section 52 corresponding to the bottom 521 and having the S-shape in cross section, and the two portions are arranged sequentially in the circumferential direction. The number of the portions corresponding to the bottom 521 of the substantially U-shape of the folded-back section 52 increases and decreases in accordance with the length of a section (the bent section of the coil 30) that is provided with the folded-back section 52.

Further, according to the first embodiment, at the folded-back section 52, the stacked layers of the insulating sheet 51 that structure the bottom 521 of the substantially U-shape are fixed to each other. Specifically, a substantially central portion 523 (refer to FIG. 9) (about half the width of the bottom 521) of the bottom 521 of the substantially U-shape is fixed by, for example, ultrasonic welding, thermocompression bonding, adhesive application, or a combination of these. Thus, the three layers of the insulating sheet 51 that structure the bottom 521 of the substantially U-shape are fixed to each other.

Further, according to the first embodiment, as illustrated in FIG. 5, the insulating sheet 51 includes slot-held-section covering sections 53 that cover the slot-held sections 31 of the coil 30, and coil-end-section covering sections 54 that cover the coil end sections 32 of the coil 30. The slot-held-section covering sections 53 and the coil-end-section covering sections 54 are formed integrally together. Specifically, as described later, a pair of coil end sections 32 and a pair of slot-held sections 31 of the coil 30 are covered with one insulating sheet 51 that is deformed in an annular shape after being bent into a substantially U-shape.

Figure 10:
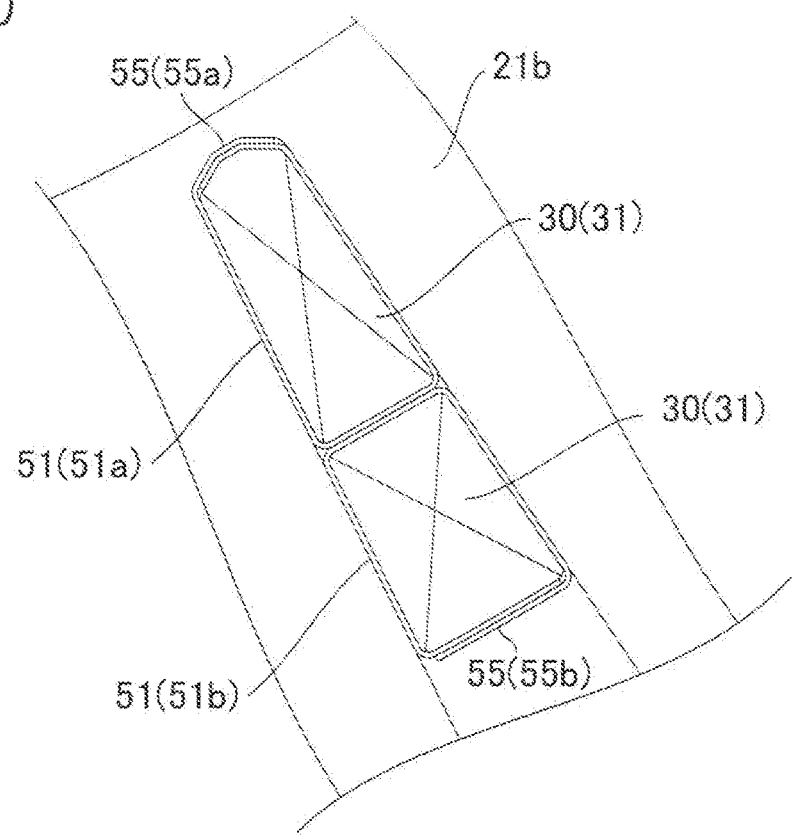
FIG. 10 is an enlarged cross-sectional view of the coils disposed in the stator.

As illustrated in FIG. 6, the insulating sheet 51 that is bent in the substantially U-shape has end sections 55 that define an opening of the substantially U-shape and that protrude toward the outer diameter side beyond the outermost diameter portion of the coil 30. Specifically, the conductive wire 40 is layered sequentially from the inner side to the outer side of the insulating sheet 51 that is bent in the substantially U-shape, to such an extent that the conductive wire 40 does not reach the opening of the insulating sheet 51. As illustrated in FIG. 10, portions of the insulating sheet 51 that protrude toward the outer diameter side beyond the outermost diameter portion of the coil 30 are closed together after the coil 30 (the conductive wire 40) is wound within the insulating sheet 51. Specifically, the portions that protrude toward the outer diameter side are closed by overlapping each other so as not to expose the conductive wire 40.

Further, according to the first embodiment, multiple coils 30 (coils 30 of the same phase) are arranged adjacent to each other (refer to FIG. 2). As illustrated in FIG. 10, the slot-held section 31 of one of adjacent coils 30 and the slot-held section 31 of the other of the adjacent coils 30 are disposed in the same slot 22. The insulating sheet 51 (an insulating sheet 51a) that covers the slot-held section 31 disposed on the inner diameter side of the same slot 22 opens to the inner diameter side of the stator core 21 (end sections 55a are located). On the other hand, the insulating sheet 51 (an insulating sheet 51b) that covers the slot-held section 31 disposed on the outer diameter side of the slot 22 opens to the outer diameter side of the stator core 21 (end sections 55b is located).

Specifically, as illustrated in FIG. 2, in the same slot 22, the slot-held section 31b of the second coil 30b is disposed on the inner diameter side, and the slot-held section 31a of the first coil 30a is disposed on the outer diameter side. Further, in the same slot 22, the slot-held section 31c of the third coil 30c on one side in the circumferential direction is disposed on the inner diameter side, and the slot-held section 31c of the third coil 30c on the other side in the circumferential direction is disposed on the outer diameter side. In each case, the insulating sheet 51a that covers the slot-held section 31 disposed on the inner diameter side of the slot 22 opens toward the inner diameter side of the stator core 21, and the insulating sheet 51b that covers the slot-held section 31 disposed on the outer diameter side of the slot 22 opens toward the outer diameter side of the stator core 21.

(Method for Manufacturing Insulating Sheet)

Next, a method for manufacturing the insulating sheet 51 is described.

Figure 11:
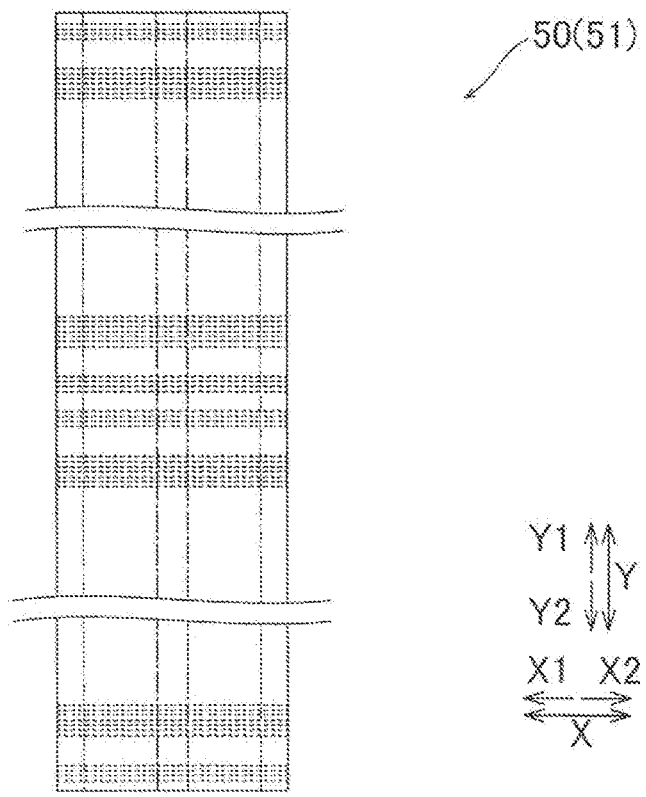
FIG. 11 is a developed view of the insulating member according to the first embodiment of the present disclosure.
Figure 12:
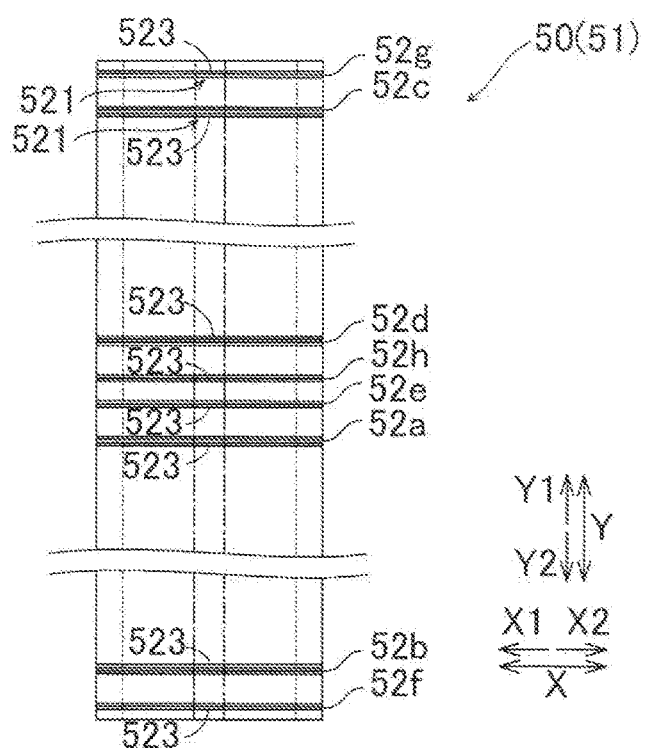
FIG. 12 is a diagram illustrating a state where the insulating member in FIG. 11 is folded back (a state where a folded-back section is formed).
Figure 13:
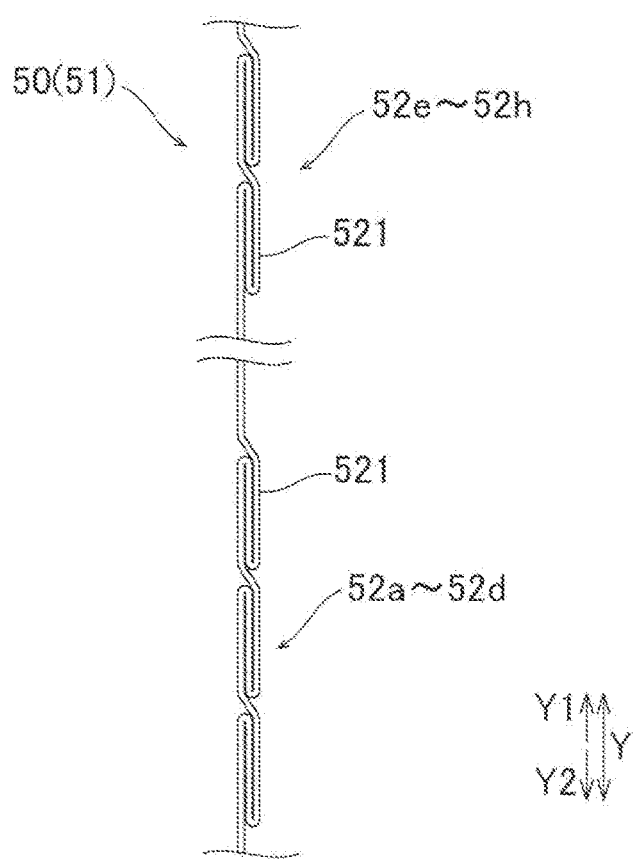
FIG. 13 is a side view of the insulating member in FIG. 12.

First, as illustrated in FIG. 11, a substantially rectangular insulating sheet 51 is prepared. Next, as illustrated in FIG. 12, the folded-back sections 52 are formed by folding back the insulating sheet 51 multiple times in a Y-direction along lines (refer to dotted lines in FIG. 11) that are along an X-direction, in such a manner that layers of the insulating sheet 51 are stacked to have an S-shape in cross section. As illustrated in FIG. 12, the insulating sheet 51 is folded back such that each of the folded-back sections 52e to 52h of the insulating sheet 51 has multiple (two in the first embodiment) bottoms 521 each of which has the substantially S-shape and which are arranged sequentially in the Y-direction. Further, as illustrated in FIG. 12, the insulating sheet 51 is folded back such that each of the folded-back sections 52a to 52d of the insulating sheet 51 has multiple (three in the first embodiment) bottoms 521 each of which has the substantially S-shape and which are arranged sequentially in the Y-direction. Further, the insulating sheet 51 is folded back such that each folded-back section 52 becomes flat. That is, the insulating sheet 51 is folded back such that the thickness of the folded-back section 52 becomes small.

Next, the vicinity of the substantially central portion 523 that is located substantially in the center of each folded-back section 52 of the insulating sheet 51 in the X-direction (the vicinity of the substantially central portion 523 that is located substantially in the center of a portion that structures the bottom 521 of the substantially U-shape) is fixed by, for example, ultrasonic welding, thermocompression bonding, adhesive application, or a combination of these. Specifically, the stacked layers of the insulating sheet 51 are joined to each other.

Figure 14:
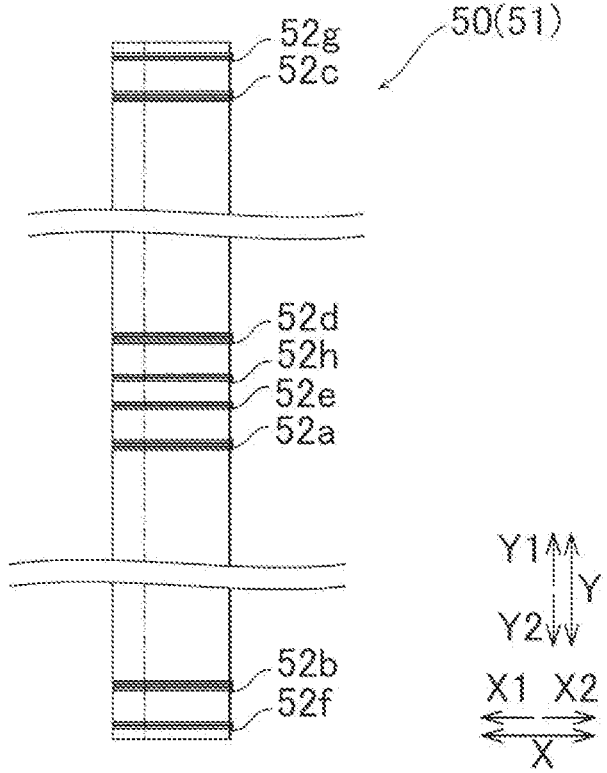
FIG. 14 is a diagram illustrating a state where the insulating member in FIG. 12 is bent in a substantially U-shape.

Then, as illustrated in FIG. 14, the insulating sheet 51 is bent in the X-direction along lines (refer to long dashed short dashed lines in FIG. 12) that are along the Y-direction. Thus, the insulating sheet 51 is bent in a substantially U-shape in cross section. Further, after the conductive wire 40 is wound on the insulating sheet 51 that is bent in the substantially U-shape, as described later, the insulating sheet 51 is bent along lines (long dashed double-dotted lines in FIG. 12) that are along the Y-direction such that an opening of the substantially U-shape is closed (refer to FIG. 25). Thus, the conductive wire 40 is covered with the insulating sheet 51.

(Manufacturing and Shaping of Coil)

Next, manufacturing and shaping of the coil 30 are described.

Figure 15:
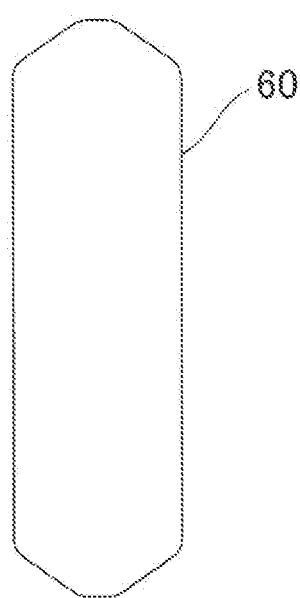
FIG. 15 is a plan view of a bobbin.

As illustrated in FIG. 15, a bobbin 60 is prepared. The bobbin 60 has a shape corresponding to a shape (e.g., an octagonal shape) into which the coil 30 will be shaped.

Next, as illustrated in FIG. 5, the insulating sheet 51 is arranged on the bobbin 60. Specifically, the insulating sheet 51 that is bent in a substantially U-shape is arranged to form an annular shape such that the substantially U-shape opens toward the outer diameter side. At this time, the linear insulating sheet 51 is arranged on the octagonal bobbin 60.

Therefore, at each folded-back section 52 of the insulating sheet 51, the portion (on the inner diameter side) that structures the bottom 521 of the substantially U-shape remains folded (S-shape in cross section), while the folds on the outer diameter side are unfolded along the circumferential direction. Since the portion of the insulating sheet 51 that structures the bottom 521 of the substantially U-shape is fixed, it is hard for the insulating sheet 51 to spread out in the circumferential direction (in a direction along the bent section of the coil 30) on the bottom 521 side (on the inner diameter side). The end sections of the insulating sheet 51 that is arranged in an annular shape are fixed together by ultrasonic welding or the like.

Next, as illustrated in FIG. 5, the conductive wire 40 is wound in layers from the inner diameter side to the outer diameter side. Specifically, the conductive wire 40 is wound (refer to FIG. 5 and FIG. 6) from the inner side of the insulating sheet 51 that is bent in the substantially U-shape, to such an extent that the conductive wire 40 does not reach the opening of the insulating sheet 51. After that, portions of the insulating sheet 51 that protrude toward the outer diameter side beyond the outermost diameter portion of the coil 30 are closed together (refer to FIG. 10).

Figure 16:
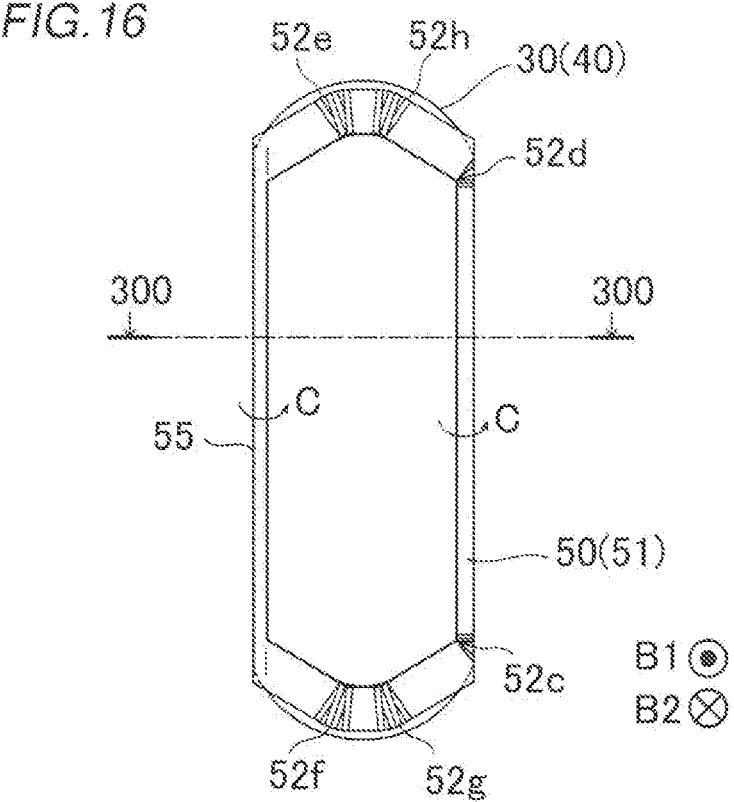
FIG. 16 is a diagram illustrating a state where the slot-held section of the coil in FIG. 5 is twisted.
Figure 17:
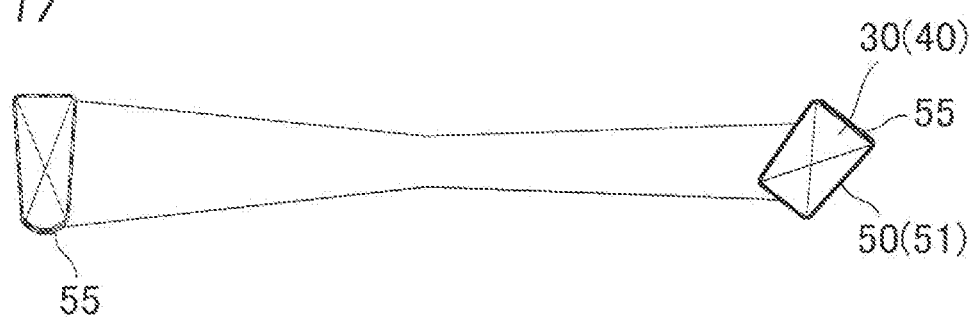
FIG. 17 is a cross-sectional view along line 300-300 in FIG. 16.

Next, as illustrated in FIG. 16 and FIG. 17, one of the slot-held sections 31 and the other of the slot-held sections 31 of the coil 30 that is formed by winding the conductive wire 40 are each twisted in a C direction. Thus, at a section of the insulating sheet 51 corresponding to one of the slot-held sections 31 (on the left side of the sheet), a portion (the closed portion, the end section 55) corresponding to the opening of the insulating sheet 51 faces toward the front side of the sheet (in a B1-direction), and at a section of the insulating sheet 51 corresponding to the other of the slot-held sections 31 (on the right side of the sheet), a portion corresponding to the opening of the insulating sheet 51 faces toward the back side of the sheet (in a B2-direction).

Next, the coil 30 is deformed (bent) to follow the circumferential curvature of the stator core 21. The third coil 30c is further deformed such that one of the slot-held sections 31c is located on the inner diameter side and such that the other of the slot-held sections 31c is located on the outer diameter side.

The bent coils 30 are disposed in the slots 22 of the stator core 21. At this time, out of the coils 30 disposed in the same slot 22, the insulating sheet 51a (refer to FIG. 10) that covers the slot-held section 31 disposed on the inner diameter side of the slot 22 is disposed so as to open toward the inner diameter side of the stator core 21. On the other hand, the insulating sheet 51b (refer to FIG. 10) that covers the slot-held section 31 disposed on the outer diameter side of the slot 22 is disposed so as to open toward the outer diameter side of the stator core 21.

Figure 18:
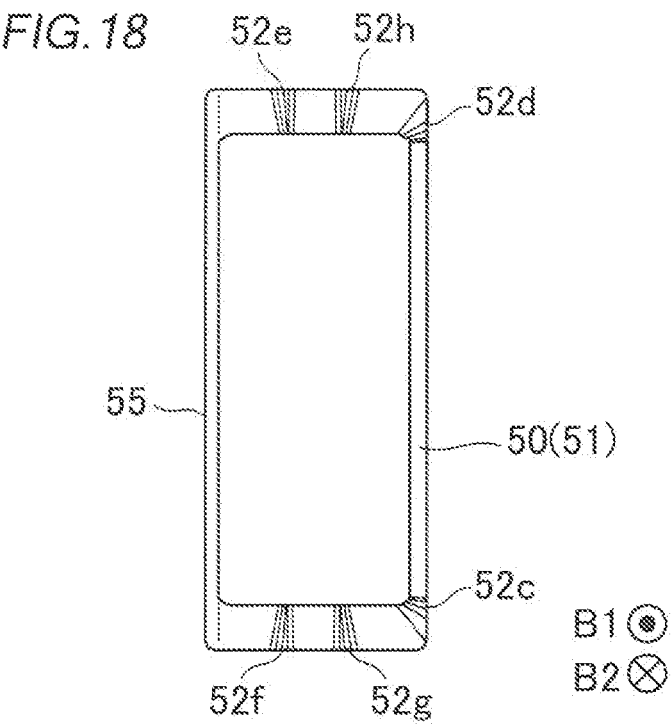
FIG. 18 is a diagram illustrating a state where the coil end section of the coil in FIG. 16 is shaped (deformed).
Figure 19:
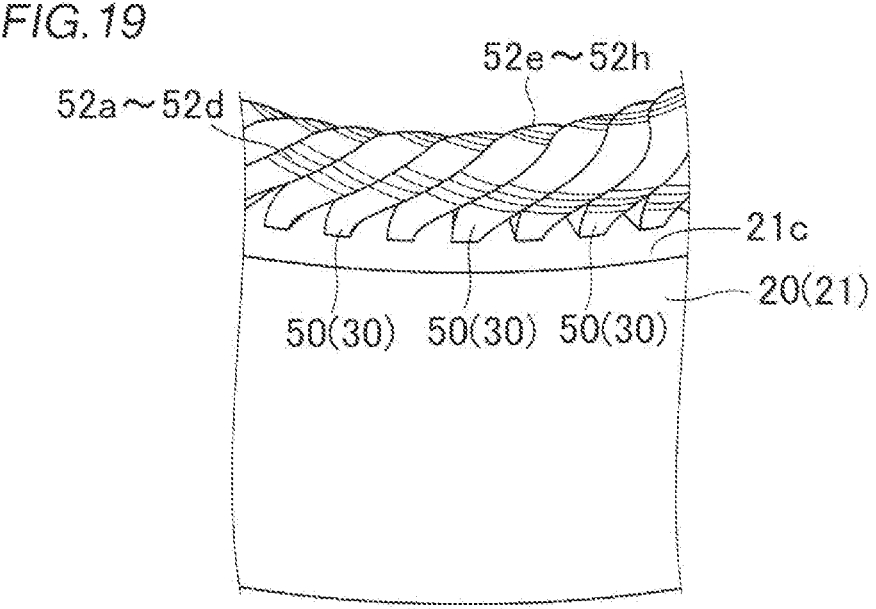
FIG. 19 is a diagram illustrating a state where the coil end section of the coil disposed in a stator core is shaped (deformed).

Finally, as illustrated in FIG. 18 and FIG. 19, the coil end sections 32 of the coil 30 disposed in the slots 22 are bent toward the inner diameter side (toward the back side of the sheet), so that the coil 30 is shaped. At this time, the folded-back sections 52 where layers of the insulating sheet 51 are stacked are spread out (unfolded) to follow deformation of the shape of the coil 30, thus preventing damage to the insulating sheet 51.

Figure 20:
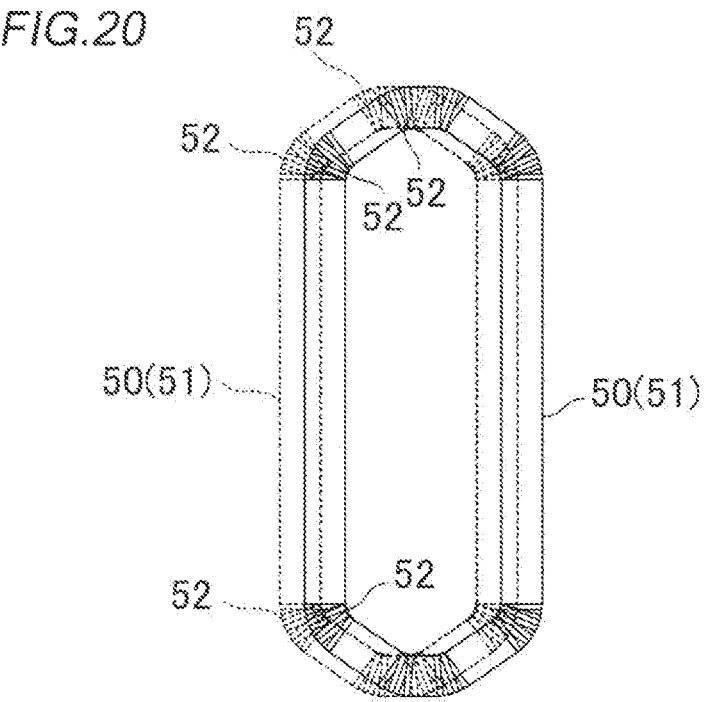
FIG. 20 is a diagram illustrating two insulating members (coils) that are arranged adjacent to each other.

As illustrated in FIG. 20, when the coils 30 are disposed in the slots 22, the coil end sections 32 of adjacent ones of the coils 30 overlap each other as seen from the diametrical direction of the stator 20. On the coil inner diameter side that is a high voltage portion, the folded-back section 52 (the side 522) of the insulating sheet 51 has a stack of at most three layers of the insulating sheet 51. Thus, at most six layers (=three layers×two) of the insulating sheet 51 are arranged between two coil end sections 32 that overlap each other when viewed from the radial direction of the stator 20. Further, by adjusting the folded-back sections 52 such that the folded-back sections 52 are tightly arranged, at least four layers (one layer+three layers) are arranged. This makes it possible to more reliably ensure insulation between the coil end sections 32 of adjacent coils 30.

[Effects of the First Embodiment]

The first embodiment has the following effects.

According to the first embodiment, as described above, the insulating sheet 51 includes the folded-back sections 52 that are provided in portions corresponding to the bent sections of the coil 30 and in the portions the insulating sheet 51 is folded back multiple times such that layers of the insulating sheet 51 are stacked. Thus, since the folded-back sections 52 where layers of the insulating sheet 51 are stacked are spread out (unfolded) to follow deformation of the bent section of the coil 30 in the shaping process, the insulating member 50 is prevented from being damaged due to the deformation of the coil 30. This prevents the possibility that insulation between the coils 30 becomes insufficient due to damage to the insulating members 50.

Further, according to the first embodiment, as described above, at the portion of each folded-back section 52 corresponding to the bottom 521 of the substantially U-shape, the insulating sheet 51 is folded back such that the layers are stacked to have an S-shape in cross section, and at the portion of each folded-back section 52 corresponding to the side 522 of the substantially U-shape, the stacked layers overlap each other. This allows the folded-back section 52 to be unfolded to follow the deformation of the coil 30 in the shaping process, in such a manner that the folded-back section 52 is opened like a fan about the portion of the folded-back section 52 corresponding to the bottom 521 of the substantially U-shape. The folded-back section 52 is deformed such that the outer diameter side is unfolded like a fan with the inner diameter side folded. This facilitates making the insulating member 50 into an annular shape. Further, since the insulating sheet 51 is folded back such that the stacked layers have an S-shape in cross section, the thickness of the insulating sheet 51 is reduced compared to when the insulating sheet 51 is folded back in a wavy shape (a W-shape).

Moreover, according to the first embodiment, as described above, multiple portions each being the portion of the folded-back section 52 corresponding to the bottom 521 and having the S-shape in cross section are provided in a portion corresponding to the bent section of the coil 30 and are arranged sequentially in the circumferential direction. Thus, even when the bent section of the coil 30 becomes relatively large (long in the circumferential direction), the insulating sheet 51 (the folded-back section 52) is deformable to accommodate the relatively large bent section of the coil 30.

Furthermore, according to the first embodiment, as described above, at the folded-back section 52, the layers of the insulating sheet 51 that structure the bottom 521 of the substantially U-shape are fixed to each other. This prevents the layered state of the insulating sheet 51 that structures the bottom 521 from being released, thus allowing the folded-back section 52 to be easily opened like a fan about the portion of the folded-back section 52 corresponding to the bottom 521 of the substantially U-shape.

In addition, according to the first embodiment, as described above, the slot-held-section covering sections 53 and the coil-end-section covering sections 54 of the insulating sheet 51 are formed integrally together. This makes it possible to cover substantially the whole of the coil 30 with one insulating sheet 51, thus preventing an increase in the number of parts.

Further, according to the first embodiment, as described above, the slot-held section 31 of one of adjacent coils 30 and the slot-held section 31 of the other of the adjacent coils 30 are disposed in the same slot 22. In addition, one insulating member 50 that covers the slot-held section 31 disposed on the inner diameter side of the same slot 22 opens toward the inner diameter side of the stator core 21, and the other insulating member 50 that covers the slot-held section 31 disposed on the outer diameter side of the slot 22 opens toward the outer diameter side of the stator core. This causes the openings of the insulating members 50 disposed in the same slot 22 to face opposite directions, thus preventing contact (a short-circuit) between the conductive wires 40 that protrude from the openings of the respective insulating members 50.

[Second Embodiment]

With reference to FIGS. 21 to 25, the structure of a rotating electrical machine 101 (a stator 120) according to a second embodiment is described. An insulating member 150 of the rotating electrical machine 101 according to the second embodiment includes insulating sheets 152 that are provided to overlap respective slot-held-section covering sections 151a of an insulating sheet 151. The insulating sheet 151 is an example of a "first insulating sheet" and an "insulating member body." The insulating sheet 152 is an example of a "second insulating sheet" and an "insulating member body."

Figure 21:
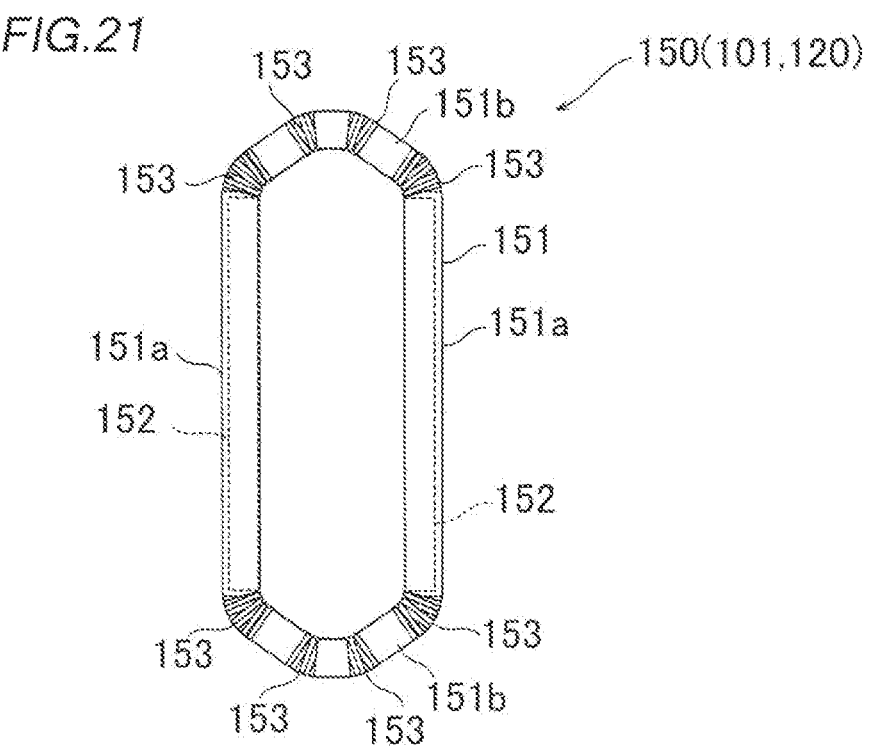
FIG. 21 is a diagram illustrating an insulating member according to the second embodiment of the present disclosure.
Figure 22:
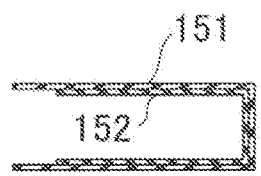
FIG. 22 is a cross-sectional view of the insulating member according to the second embodiment of the present disclosure.

As illustrated in FIG. 21, as in the first embodiment, the insulating sheet 151 includes the slot-held-section covering sections 151a that cover the slot-held sections 31, and coil-end-section covering sections 151b that cover the coil end sections 32. As illustrated in FIG. 22, the insulating sheet 152 is provided to overlap the insulating sheet 151 on the side corresponding to the inner side of the slot-held-section covering section 151a that has a substantially U-shape. Thus, each insulating sheet 152 is located between the coil 30 and the insulating sheet 151.

Figure 23:
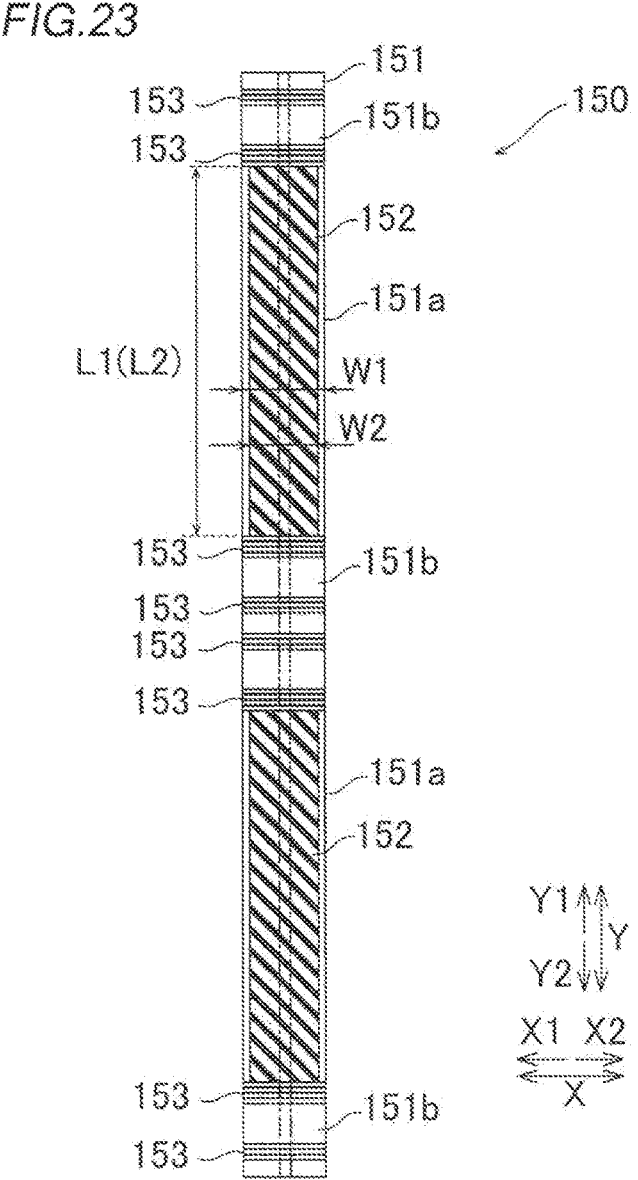
FIG. 23 is a diagram illustrating a state where the insulating member is folded back (a state where a folded-back section is formed).

Further, as illustrated in FIG. 23, a length L1 of each of the insulating sheets 152 in a direction along a Y-direction is substantially equal to a length L2 of each of the slot-held-section covering sections 151a in the direction along the Y-direction. On the other hand, a width W1 of each of the insulating sheets 152 in a direction along an X-direction is less than a width W2 of each of the slot-held-section covering sections 151a in the direction along the X-direction. It is noted that one layer of the insulating sheet 152 is provided.

According to the second embodiment, the insulating sheets 152 are structured of a material that has insulation performance superior to the insulating sheet 151. Specifically, the insulating sheet 151 may be structured with, for example, Nomex (a registered trademark). Nomex is a fiber (paper) made of an aramid polymer. On the other hand, the insulating sheets 152 may be structured with, for example, Kapton (a registered trademark). Kapton is a film made of polyimide.

Each insulating sheet 152 is partially welded to the insulating sheet 151, for example, by ultrasonic waves. That is, the insulating sheet 152 is temporarily fixed to the insulating sheet 151. Thus, unlike when the insulating sheets 151 and 152 made of different materials are wholly bonded together, warpage of the insulating sheets 151 and 152 is preventable. The insulating member 150 (the insulating sheet 151 and the insulating sheets 152) is bent in a substantially U-shape and then is disposed, together with the coil 30, in the slot 22. As a result, the insulating member 150 (the insulating sheet 151 and the insulating sheets 152) is sandwiched between the coil 30 and the slot 22. Thus, although the insulating sheet 152 is temporarily fixed to the insulating sheet 151, the insulating sheet 152 is not separated from the insulating sheet 151.

The other structure of the second embodiment is the same as that of the first embodiment.

(Method for Manufacturing Insulating Sheet)

Next, a method for manufacturing the insulating member 150 is described.

First, as illustrated in FIG. 23, a substantially rectangular insulating sheet 151 is prepared. Next, the insulating sheets 152 are partially welded to the insulating sheet 151, for example, by ultrasonic waves. For example, edge sections of each insulating sheet 152 in the X-direction (in an X1-direction, in an X2-direction) are welded together along the Y-direction. The insulating member 150 then is folded back multiple times in the Y-direction to form folded-back sections 153.

Next, the vicinity of a substantially central portion of each folded-back section 153 that is located substantially in the center of a portion that structures the bottom of a substantially U-shape is fixed by, for example, ultrasonic welding, thermocompression bonding, adhesive application, or a combination of these.

Figure 24:
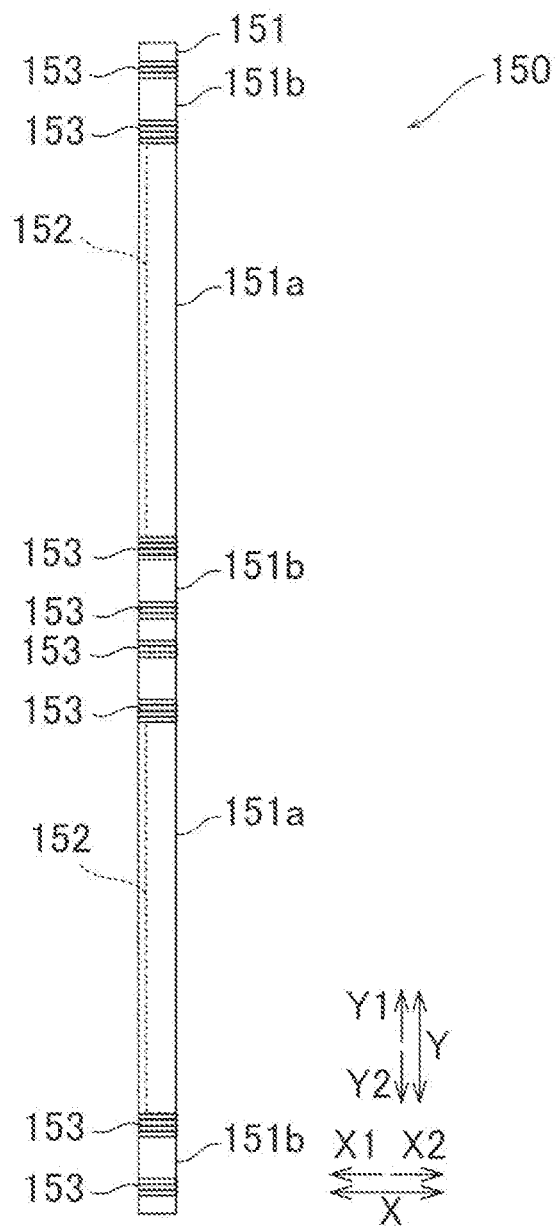
FIG. 24 is a diagram illustrating a state where the insulating member in FIG. 23 is bent in a substantially U-shape.
Figure 25:
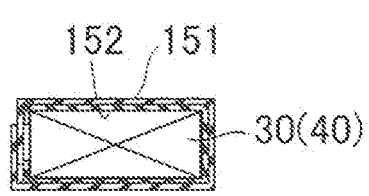
FIG. 25 is a diagram illustrating a state where end sections of the substantially U-shaped insulating member are bent to cover the coil.

Next, as illustrated in FIG. 24, the insulating member 150 (the insulating sheet 151, the insulating sheets 152) is bent in the X-direction. Thus, the insulating sheet 51 is bent in a substantially U-shape in cross section. After that, the insulating member 150 is placed on the bobbin 60 (refer to FIG. 15) such that the insulating member 150 is arranged along the bobbin 60 (in an annular shape). The conductive wire 40 then is wound on the insulating member 150 that remains on the bobbin 60. Finally, as illustrated in FIG. 25, the insulating sheet 151 and the insulating sheet 152 are bent to cover the conductive wire 40 (the coil 30).

[Effects of the Second Embodiment]

The second embodiment has the following effects.

According to the second embodiment, as described above, the insulating member 150 includes the insulating sheets 152 that are provided to overlap the insulating sheet 151. Thus, the slot-held sections 31 of the coil 30 are each covered with a double-layered insulation member (the insulating sheet 151, the insulating sheet 152), so that insulation performance for the slot-held sections 31 of the coil 30 are improved.

Further, according to the second embodiment, as described above, the insulating sheets 152 are structured of a material that has insulation performance superior to the insulating sheet 151. This ensures that the insulation performance for the slot-held sections 31 of the coil 30 is improved.

[Third Embodiment]

Figure 26:
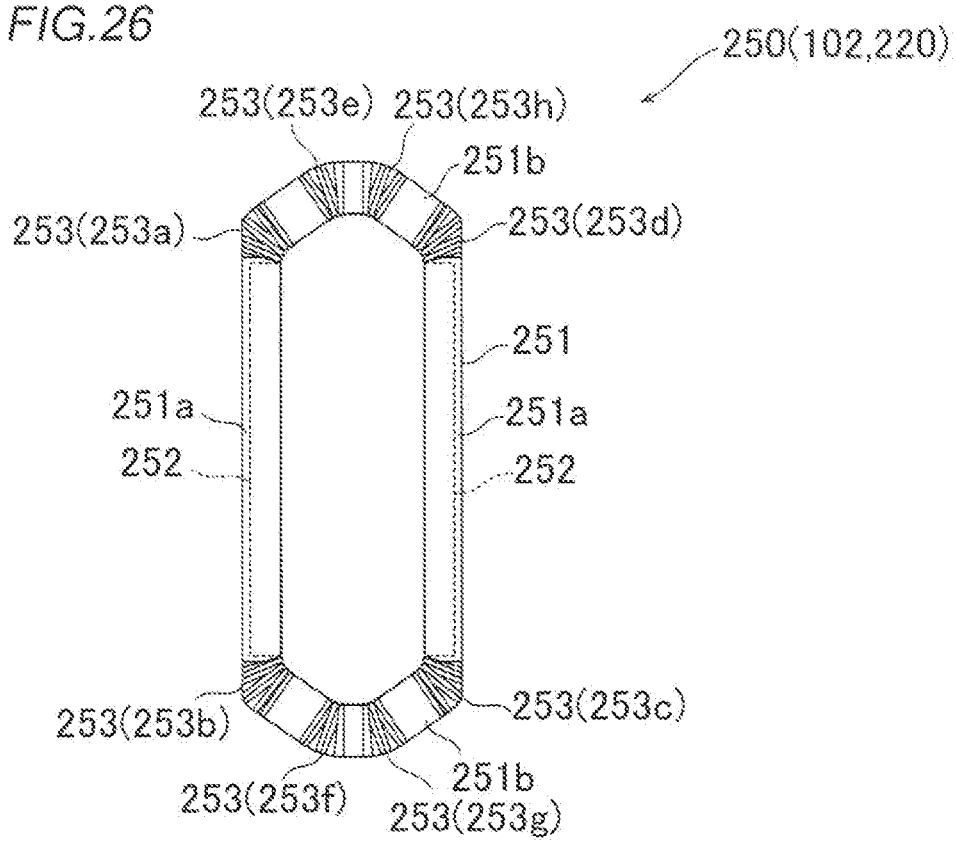
FIG. 26 is a diagram illustrating an insulating member according to the third embodiment of the present disclosure.
Figure 27:
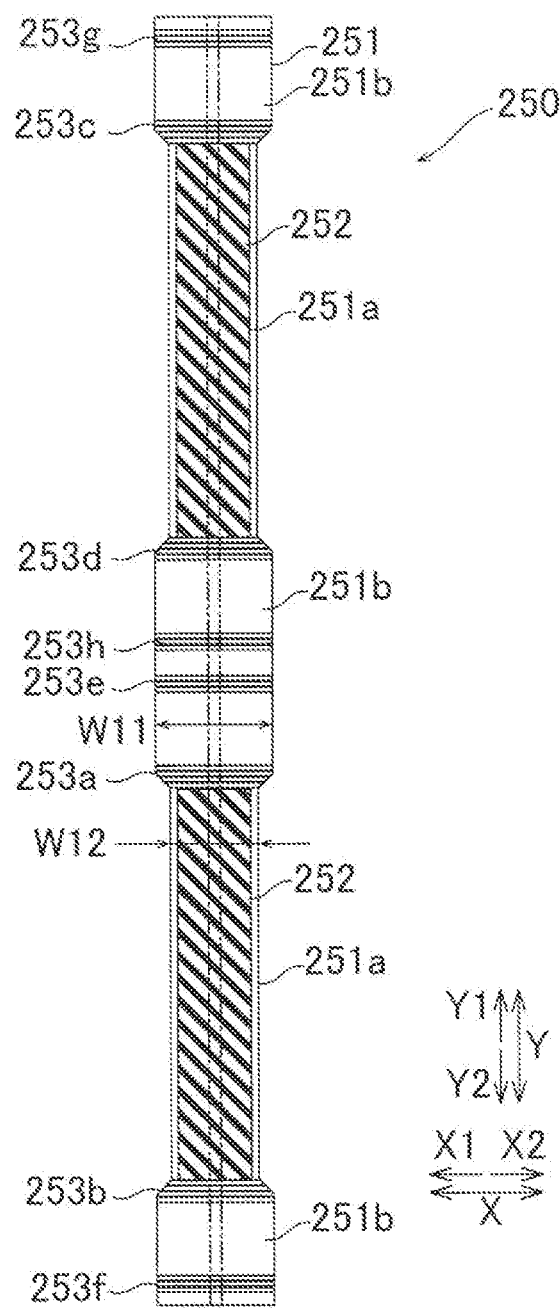
FIG. 27 is a diagram illustrating a state where the insulating member is folded back (a state where a folded-back section is formed).
Figure 28:
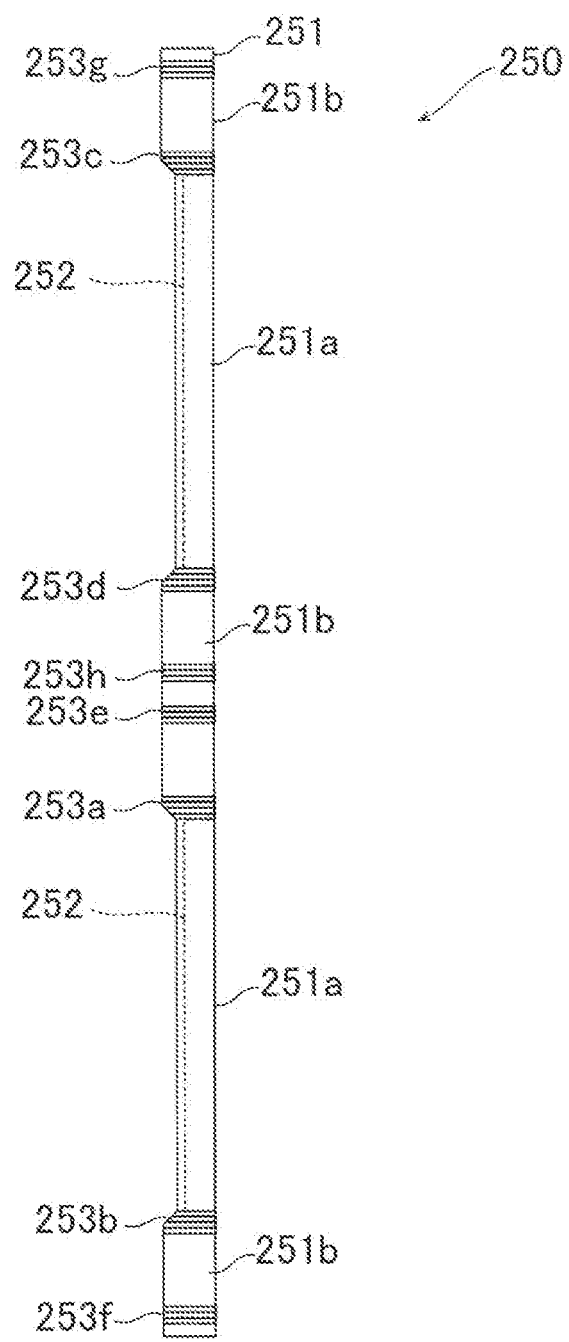
FIG. 28 is a diagram illustrating a state where the insulating member in FIG. 27 is bent in a substantially U-shape.

With reference to FIGS. 26 to 28, the structure of a rotating electrical machine 102 (a stator 220) according to a third embodiment is described. In the rotating electrical machine 102 (the stator 220) according to the third embodiment, a width W11 of each of coil-end-section covering sections 251b of an insulating member 250 is greater than a width W12 of each of slot-held-section covering sections 251a.

As illustrated in FIG. 26, as in the second embodiment, an insulating sheet 251 includes the slot-held-section covering sections 251a that cover the slot-held sections 31, and the coil-end-section covering sections 251b that cover the coil end sections 32. The width W11 (refer to FIG. 27) of the coil-end-section covering section 251b in a direction perpendicular to a direction in which the insulating sheet 251 extends is greater than the width W12 (refer to FIG. 27) of the slot-held-section covering section 251a in the direction perpendicular to the direction in which the insulating sheet 251 extends. As illustrated in FIG. 27, each coil-end-section covering section 251b protrudes in an X-direction from the slot-held-section covering section 251a at both an X1-direction side and an X2-direction side. Thus, after the insulating member 250 is bent in a substantially U-shape (refer to FIG. 26), the coil-end-section covering section 251b protrudes beyond the slot-held-section covering section 251a at both sides of the substantially U-shape. The insulating sheet 251 is an example of a "first insulating sheet" and an "insulating member body."

Here, there is a possibility that when the slot-held sections 31 of the coil 30 are twisted (refer to FIG. 16), the conductive wire 40 may be displaced in the direction of the long axis of the coil 30. Even in this case, the conductive wire 40 is prevented from popping out of the coil-end-section covering section 251b, because the width W11 of the coil-end-section covering section 251b in the direction perpendicular to the direction in which the insulating sheet 251 extends is greater than the width W12 of the slot-held-section covering section 251a in the direction perpendicular to the direction in which the insulating sheet 251 extends.

Further, according to the third embodiment, the width W11 of the coil-end-section covering section 251b in the direction perpendicular to the direction in which the insulating sheet 251 extends gradually increases from the side connected to the slot-held-section covering section 251a in a direction away from the slot-held-section covering section 251a. Specifically, the coil-end-section covering section 251b is formed to extend in the direction in which the insulating sheet 251 extends, in such a manner that the width W11 gradually increases, in a tapered manner from the side connected to the slot-held-section covering section 251a and then the width W11 becomes constant. The tapered portions of the coil-end-section covering sections 251b correspond to later-described folded-back sections 253a to 253d of the insulating member 250.

As in the second embodiment, the insulating sheet 251 has folded-back sections 253 (253a to 253h) that are provided in portions corresponding to bent sections of the coil 30 and in the portions the insulating sheet 251 is folded back such that layers of the insulating sheet 251 are stacked. Further, as in the second embodiment, each slot-held-section covering section 251a is provided with an insulating sheet 252. The insulating sheet 252 is an example of a "second insulating sheet" and an "insulating member body."

[Effects of the Third Embodiment]

The third embodiment has the following effects.

According to the third embodiment, the width W11 of the coil-end-section covering section 251b in the direction perpendicular to the direction in which the insulating sheet 251 extends is greater than the width W12 of the slot-held-section covering section 251a in the direction perpendicular to the direction in which the insulating sheet 251 extends. Thus, even if the conductive wire 40 is displaced in the direction of the long axis of the coil 30 when the slot-held sections 31 of the coil 30 are twisted (refer to FIG. 16), the conductive wire 40 is prevented from popping out of the coil-end-section covering sections 251b.

Further, according to the third embodiment, as described above, the width W11 of the coil-end-section covering section 251b in the direction perpendicular to the direction in which the insulating sheet 251 extends gradually increases from the side connected to the slot-held-section covering section 251a in the direction away from the slot-held-section covering section 251a. This facilitates deforming the folded-back sections 253a to 253h into a fan shape when the insulating member 250 is deformed into an annular shape. Further, the width of the insulating member 250 that is deformed in an annular shape gradually increases from the slot-held-section covering section 251a to the coil-end-section covering section 251b, thus allowing the outer shape of the annular insulating member 250 to follow the shape of the bent sections of the coil 30.

[Modifications]

It is to be understood that the present disclosed embodiments are illustrative in all respects, rather than restrictive.

For example, although the first to third embodiments illustrate that the folded-back sections are provided in portions corresponding to the vicinities of the boundaries between the slot-held sections and the coil end sections, and are provided in portions corresponding to the vicinities of the top portions of the coil end sections, the present disclosure is not limited to this. For example, the folded-back sections may be provided in portions other than the portions corresponding to the vicinities of the boundaries between the slot-held sections and the coil end sections and the portions corresponding to the vicinities of the top portions of the coil end sections.

Further, although the first to third embodiments illustrate that the insulating sheet is provided to cover the coil in a substantially U-shape from the inner diameter side to the outer diameter side of the coil, the present disclosure is not limited to this. For example, the insulating sheet may be structured to cover the coil from the outer diameter side to the inner diameter side of the coil in a substantially U-shape.

Further, although the first to third embodiments illustrate that at the portion of the folded-back section corresponding to the bottom of the substantially U-shape, the insulating sheet is folded back such that layers (three layers) of the insulating sheet are stacked to have an S-shape in cross section, the present disclosure is not limited to this. For example, at the portion of the folded-back section corresponding to the bottom of the substantially U-shape, the insulating sheet may be folded back such that four or more layers are stacked.

Further, although the first to third embodiments illustrate that multiple portions each being the portion of the folded-back section corresponding to the bottom and having the S-shape in cross section are provided in a portion corresponding to the bent section of the coil and are arranged sequentially in the circumferential direction, the present disclosure is not limited to this. For example, if the bent section of the coil is small, only one portion that is the portion of the folded-back section corresponding to the bottom of the substantially U-shape may be provided.

Figure 29:
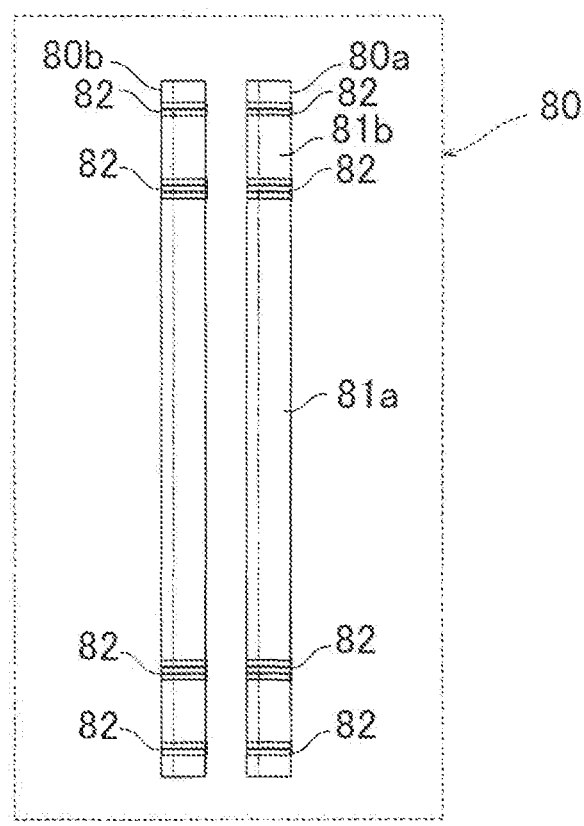
FIG. 29 is a diagram illustrating an insulating member (bent in a substantially U-shape) according to a modification of the first embodiment of the present disclosure.

Further, although the first to third embodiments illustrate that the coil is covered with one insulating member, the present disclosure is not limited to this. For example, as illustrated by a modification in FIG. 29, an insulation member 80 that is divided in two (insulating members 80a and 80b) may be prepared, and the insulation member 80 that is divided in two may be arranged on a coil (a bobbin). In the insulation member 80, a slot-held-section covering section 81a and a coil-end-section covering section 81b are formed integrally together. Each of the insulating members 80a and 80b has folded-back sections 82.

Further, although the first to third embodiments illustrate that each of the first and second coils is a single layer lap coil, the present disclosure is not limited to this. For example, every coil may be the third coil that is a double layer lap coil.

Further, although the first to third embodiments illustrate that the stator core has 48 slots, the present disclosure is not limited to this. According to the present disclosure, the number of slots provided in a stator core may be different from 48.

Further, although the second embodiment illustrates that one layer of the insulating sheet made of Kapton is provided to overlap the insulating sheet made of Nomex, the present disclosure is not limited to this. For example, two or more layers of an insulating sheet made of Kapton may be provided to overlap an insulating sheet made of Nomex.

The invention claimed is:

1. An insulating member comprising:
an insulating member body including a first insulating sheet provided in an annular shape in a radial-directional view to completely cover a coil that includes a slot-held section and a coil end section, the slot-held section configured to be held in a slot of a stator core, the coil end section configured to protrude from an end surface of the stator core in a rotation axis direction, wherein
the first insulating sheet includes a folded-back section that is provided in a portion corresponding to a bent section of the coil and in the portion the first insulating sheet is folded back a plurality of times such that layers of the first insulating sheet are stacked,
the first insulating sheet is provided to cover the coil in a substantially U-shape from an inner diameter side to an outer diameter side of the coil,
at a portion of the folded-back section corresponding to a bottom of the substantially U-shape, the first insulating sheet is folded back such that the layers are stacked to have an S-shape in cross section, and
at a portion of the folded-back section corresponding to a side of the substantially U-shape, the stacked layers overlap each other.

2. The insulating member according to claim 1, wherein a plurality of portions each being the portion of the folded-back section corresponding to the bottom and having the S-shape in cross section are provided in the portion corresponding to the bent section of the coil and are arranged sequentially in a circumferential direction.

3. The insulating member according to claim 1, wherein at the folded-back section, the stacked layers of the first insulating sheet that structure the bottom of the substantially U-shape are fixed to each other.

4. The insulating member according to claim 2, wherein at the folded-back section, the stacked layers of the first insulating sheet that structure the bottom of the substantially U-shape are fixed to each other.

5. The insulating member according to claim 1, wherein the first insulating sheet includes a slot-held-section covering section that covers the slot-held section, and a coil-end-section covering section that covers the coil end section, and
the slot-held-section covering section and the coil-end-section covering section are formed integrally together.

6. The insulating member according to claim 1, wherein the first insulating sheet includes a slot-held-section covering section that covers the slot-held section, and a coil-end-section covering section that covers the coil end section, and the insulating member body further includes a second insulating sheet that is provided to overlap the first insulating sheet.

7. The insulating member according to claim 6, wherein the second insulating sheet is structured of a material that has insulation performance superior to the first insulating sheet.

8. The insulating member according to claim 1, wherein the first insulating sheet includes a slot-held-section covering section that covers the slot-held section, and a coil-end-section covering section that covers the coil end section, and a width of the coil-end-section covering section in a direction perpendicular to a direction in which the first insulating sheet extends is greater than a width of the slot-held-section covering section in the direction perpendicular to the direction in which the first insulating sheet extends.

9. The insulating member according to claim 8, wherein the width of the coil-end-section covering section in the direction perpendicular to the direction in which the first insulating sheet extends gradually increases from a side connected to the slot-held-section covering section in a direction away from the slot-held-section covering section.

10. A stator comprising:

a stator core;

a coil disposed in the stator core, the coil including a slot-held section held in a slot of the stator core, and a coil end section protruding from an end surface of the stator core in a rotation axis direction; and an insulating member provided in an annular shape in a radial-directional view to completely cover the coil, wherein the insulating member includes a folded-back section that is provided in a portion corresponding to a bent section of the coil and in the portion the insulating member is folded back a plurality of times such that layers of the insulating member are stacked, the insulating member is provided to cover the coil in a substantially U-shape from an inner diameter side to an outer diameter side of the coil, at a portion of the folded-back section corresponding bottom of the substantially U-shape, the insulating member is folded back such that the layers are stacked to have S-shape in cross section, and at a portion of the folded-back section corresponding to a side of the substantially U-shape, the stacked layers overlap each other.

11. The stator according to claim 10, wherein the coil is one of a plurality of coils disposed adjacent to each other, the insulating member is one of a plurality of insulating members, each coil of the plurality of coils is covered by a respective insulating member of the plurality of insulating members, the slot-held section of one of adjacent ones of the plurality of coils and the slot-held section of the other of the adjacent ones of the plurality of coils are disposed in the same one of the slots, and one of the plurality of insulating members that covers the slot-held section disposed on an inner diameter side of the same one of the slots opens toward an inner diameter side of the stator core, and the other of the plurality of insulating members that covers the slot-held section disposed on an outer diameter side of the same one of the slots opens toward an outer diameter side of the stator core.

* * * * *